May 1, 1928.

A. BOTHE

PIE PLATE

Filed April 7, 1927

1,668,101

WITNESS:

INVENTOR
Andreas Bothe
BY
Augustus B Stoughton
ATTORNEY.

Patented May 1, 1928.

1,668,101

UNITED STATES PATENT OFFICE.

ANDREAS BOTHE, OF ORELAND, PENNSYLVANIA.

PIE PLATE.

Application filed April 7, 1927. Serial No. 181,734.

The principal object of the present invention is to provide a plate in which pies can be made, baked and sold and which, consisting of a single piece of paper, possesses an edge properly formed for the dough cutting operation and also the necessary smoothness of surface for pie formation and removal and the necessary strength for pie transportation.

Other objects of the invention will appear from the following description and, generally stated, the invention comprises a pie plate consisting of a single piece of paper and including a bowl having a smooth surface and a rim circular in outline and flat and smooth at its top surface and having the fibers of the paper agglomerated below the flat surface and between the edge of the rim and the wall of the bowl, whereby the rim is upset and the plate stiffened.

Referring to the drawing forming part hereof

Figure 1:
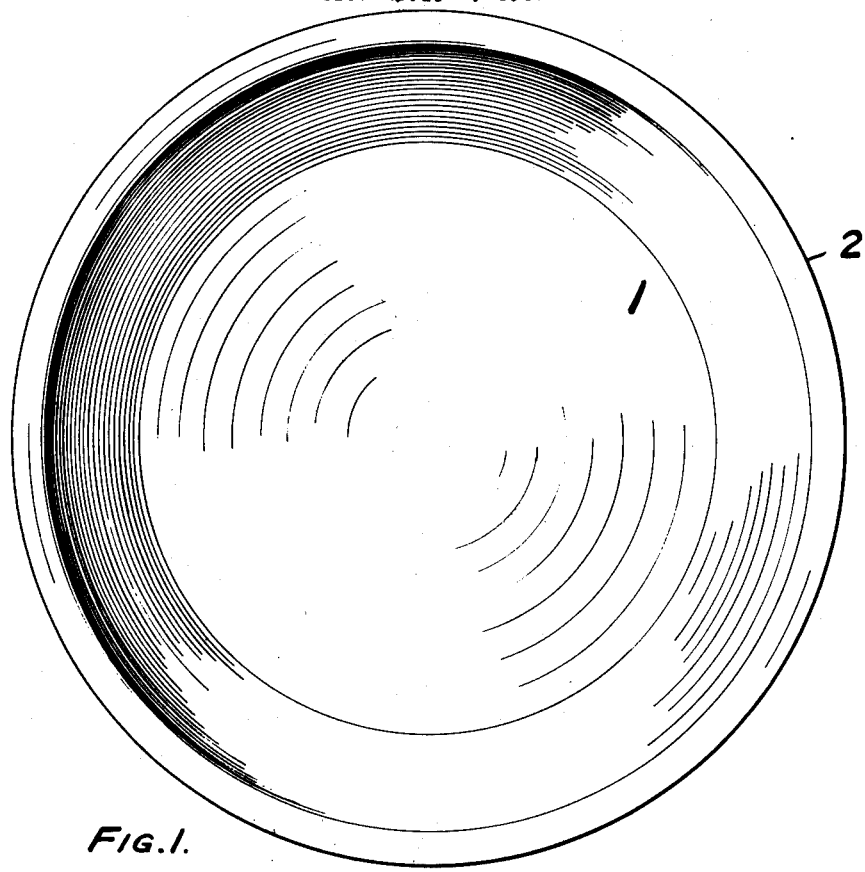
Figure 1 is a top or plan view of a pie plate embodying features of the invention.
Figure 2:
Fig. 2 is a central section of the same.
Figure 3:
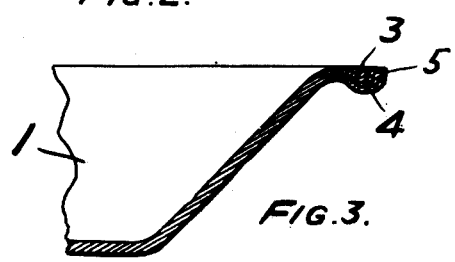
Fig. 3 is an enlarged sectional view of a portion of the plate.

Referring to the drawing the plate consists of a single piece of paper. The bowl 1 has a smooth surface throughout so that dough and crust may not adhere to it. The rim 2 is circular in contour and flat and smooth at its top surface 3. This provides a well defined circular rim over the margin of which the dough can be properly cut usually by pie making machinery. The fibers of the paper are agglomerated below the flat surface 3 and between the edge of the rim and the wall of the bowl as indicated at 4. This amounts to upsetting the rim and imparting stiffness and strength to it, while at the same time the top surface is left flat and the outer edge 5 well defined. The described upsetting of the rim imparts stiffness and strength to the plate.

It will be obvious to those skilled in the art to which the invention relates that modifications may be made in details of construction and arrangement and in matters of mere form without departing from the spirit of the invention which is not limited to such matters otherwise than the prior art and the appended claim may require.

I claim:

A pie plate consisting of a single piece of paper and including a bowl having a smooth surface and a rim circular in outline and flat and smooth on its top surface and having the fibers of the paper agglomerated and crowded below said flat surface and between the edge of the rim and the wall of the bowl, whereby the rim is upset and the plate stiffened.

ANDREAS BOTHE.